(12) United States Patent
Schadenko (10) Patent No.: US 7,711,314 B2
(45) Date of Patent: May 4, 2010

(54) BROADCASTING SIGNAL RECEIVING APPARATUS FOR PROVIDING COMBINED CHANNEL LIST FOR DIGITAL AND ANALOG SIGNAL AND CONTROL METHOD THEREOF

(75) Inventor: Sergey Schadenko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 708 days.

(21) Appl. No.: 11/582,966

(22) Filed: Oct. 19, 2006

(65) Prior Publication Data

US 2007/0099654 A1 May 3, 2007

(30) Foreign Application Priority Data

Oct. 20, 2005 (KR) .................... 10-2005-0099315

(51) Int. Cl.
*H04H 20/71* (2008.01)
*H04B 1/18* (2006.01)
(52) U.S. Cl. ................. 455/3.01; 455/154.1; 455/158.2
(58) Field of Classification Search .................. None
See application file for complete search history.

(56) References Cited

U.S. PATENT DOCUMENTS 6,600,522 B1* 7/2003 Kim ........................... 348/732
2006/0038926 A1* 2/2006 Mayer et al. ................ 348/731

FOREIGN PATENT DOCUMENTS

| CN | 1268844 A | 10/2000 |
| JP | 2001-136443 A | 5/2001 |
| KR | 10-2000-0061488 A | 10/2000 |
| KR | 10-2005-0066735 A | 6/2005 |

* cited by examiner

*Primary Examiner*—Philip J Sobutka
(74) *Attorney, Agent, or Firm*—Sughrue Mion, PLLC (57) ABSTRACT

A broadcasting signal receiving apparatus and control method thereof allow a user of the broadcasting signal receiving apparatus to receive both an analog broadcasting signal and a digital broadcasting signal, and to select a desired channel. A broadcasting signal receiving apparatus includes a signal receiving unit which receives an analog broadcasting signal and a digital broadcasting signal; a memory; and a controller which produces a combined channel list based on logical channel numbers of the analog broadcasting signal and the digital broadcasting signal and stores the combined channel list in the memory.

21 Claims, 7 Drawing Sheets

| LCN | Service Name | Type |
|---|---|---|
| 5 | RTR | D |

| RCN | Channel Name | Type |
|---|---|---|
| 1 | BBC | D |
| 2 | CNN | A |
| 3 | TNT | A |
| 6 | OCN | D |
| 7 | MTV | D |
| 350 | Discovery | D |

| RCN | Channel Name | Type |
|---|---|---|
| 1 | BBC | D |
| 2 | CNN | A |
| 3 | TNT | A |
| 5 | RTR | D |
| 6 | OCN | D |
| 7 | MTV | D |
| 350 | Discovery | D |

| LCN | Service Name | Type |
|---|---|---|
| 3 | RTR | D |

| RCN | Channel Name | Type |
|---|---|---|
| 1 | BBC | D |
| 2 | CNN | A |
| 3 | TNT | A |
| 6 | OCN | D |
| 7 | MTV | D |
| 350 | Discovery | D |

| RCN | Channel Name | Type |
|---|---|---|
| 1 | BBC | D |
| 2 | CNN | A |
| 3 | RTR | D |
| 4 | TNT | A |
| 6 | OCN | D |
| 7 | MTV | D |
| 350 | Discovery | D |

FIG. 2E

BROADCASTING SIGNAL RECEIVING APPARATUS FOR PROVIDING COMBINED CHANNEL LIST FOR DIGITAL AND ANALOG SIGNAL AND CONTROL METHOD THEREOF

CROSS-REFERENCE TO RELATED APPLICATIONS

This application claims priority from Korean Patent Application No. 10-2005-0099315, filed on Oct. 20, 2005, in the Korean Intellectual Property Office, the disclosure of which is incorporated herein by reference.

BACKGROUND OF THE INVENTION

1. Field of the Invention

Apparatuses and methods consistent with the present invention relate to a broadcasting signal receiving apparatus with an improved channel list, and a control method thereof.

2. Description of the Related Art

A broadcasting source such as a broadcasting station broadcasts analog broadcasting signals to a broadcasting signal receiving apparatus such as a television or a set-top box, and users watch images provided by the analog broadcasting signals through the broadcasting signal receiving apparatus. However, recently, broadcasting sources show a tendency to broadcast digital broadcasting signals transformed from analog broadcasting signals or both broadcasting signals in order to provide high quality pictures. Accordingly, broadcasting signal receiving apparatuses which receive and display both analog and digital broadcasting signals are being widely used.

A related art broadcasting receiving apparatus receives only analog broadcasting signals, stores channels provided by the received analog broadcasting signals as a channel list and displays the stored channels, or receives only digital broadcasting signals, stores channels provided by the received digital broadcasting signals as a channel list and displays the stored channels, or receives both analog and digital broadcasting signals, stores channels provided by both the received analog and digital broadcasting signals as respective channel lists, and displays the stored channels of the respective channel lists.

However, in the related art broadcasting signal receiving apparatus, if a user watching a channel provided by one of a digital broadcasting signal and an analog broadcasting signal wants to watch a different channel provided by the other broadcasting signal, the user inconveniently has to select the other broadcasting signal to see a channel list provided by the other broadcasting signal.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a broadcasting signal receiving apparatus allowing a user, who uses the broadcasting signal receiving apparatus for receiving both an analog broadcasting signal and a digital broadcasting signal, to select a desired channel without difficulty, and a control method thereof.

According to an aspect of the present invention, there is provided a broadcasting signal receiving apparatus, comprising: a signal receiving unit which receives an analog broadcasting signal and a digital broadcasting signal; a memory; and a controller which produces a combined channel list based on logical channel numbers of the analog broadcasting signal and the digital broadcasting signal and stores the combined channel list in the memory.

According to an aspect of the present invention, if the digital broadcasting signal corresponding to a channel contains a logical channel number and if a channel number corresponding to the logical channel number of the digital broadcasting signal corresponding to the channel is not assigned as a channel number of a broadcasting signal corresponding to a different channel, the controller updates the combined channel list such that the logical channel number is assigned as the channel number of the digital broadcasting signal corresponding to the channel.

According to an aspect of the present invention, if the digital broadcasting signal corresponding to the channel does not contain the logical channel number, the controller updates the combined channel list such that a channel number of the digital broadcasting signal corresponding to the channel is assigned a number not assigned in the combined channel list.

According to an aspect of the present invention, if the digital broadcasting signal corresponding to the channel does not contain the logical channel number, the controller generates a channel number next to a last channel number in the combined channel list and updates the combined channel list such that the generated channel number is assigned as the channel number of the digital broadcasting signal.

According to an aspect of the present invention, if the digital broadcasting signal corresponding to a channel contains the logical channel number and if a channel number corresponding to the logical channel number of the digital broadcasting signal corresponding to the channel is assigned to a different channel, the controller updates the combined channel list such that the channel number of the digital broadcasting signal corresponding to the channel is assigned to a number not assigned in the combined channel list.

According to an aspect of the present invention, if the digital broadcasting signal corresponding to the channel contains the logical channel number and if a channel number corresponding to the logical channel number of the digital broadcasting signal corresponding to the channel is assigned to the different channel, the controller generates a channel number next to a last channel number in the combined channel list and updates the combined channel list such that the generated channel number is assigned as the channel number of the digital broadcasting signal.

According to an aspect of the present invention, if the digital broadcasting signal corresponding to a channel contains the logical channel number and if a channel number corresponding to the logical channel number of the digital broadcasting signal corresponding to the channel is assigned as a channel number of a different analog broadcasting signal, the controller assigns the digital broadcasting signal to the channel number corresponding to the logical channel number and updates the combined channel list such that a channel number of the analog broadcasting signal is assigned a number not assigned to a different broadcasting signal in the combined channel list.

According to an aspect of the present invention, the controller assigns the channel number of the analog broadcasting signal as a lower channel number of channel numbers not assigned to different broadcasting signals.

According to an aspect of the present invention, if the analog broadcasting signal corresponding to a channel is received, the controller updates the combined channel list such that a channel number of the analog broadcasting signal of the channel is assigned a number not assigned to a broadcasting signal corresponding to a different channel in the combined channel list.

According to an aspect of the present invention, the controller assigns the channel number of the analog broadcasting signal as a lower channel number of channel numbers not assigned to different broadcasting signals.

According to an aspect of the present invention, the controller further stores at least one of information on whether a broadcasting signal received in the signal receiving unit is the analog broadcasting signal or the digital broadcasting signal, and receipt side information in the memory.

According to an aspect of the present invention, the broadcasting signal receiving apparatus further comprises: a display on which an image is displayed based on at least one of the digital broadcasting signal and the analog broadcasting signal; and a user selecting unit which selects a channel number, wherein, if the channel number is selected through the user selecting unit, the controller controls the signal receiving unit to select a broadcasting signal corresponding to a channel corresponding to a channel number in the combined channel list stored in the memory.

According to an aspect of the present invention, the controller controls the combined channel list stored in the memory to be displayed on the display.

According to an aspect of the present invention, the signal receiving unit comprises an analog tuner which selects the analog broadcasting signal and a digital tuner which selects the digital broadcasting signal.

The foregoing and/or other aspects of the present invention can be achieved by providing a control method of a broadcasting signal receiving apparatus, comprising: receiving an analog broadcasting signal of a channel and a digital broadcasting signal of a channel; determining logical channel numbers of the analog broadcasting signal of the channel and the digital broadcasting signal of the channel; and producing and storing a combined channel list in which channel numbers of the broadcasting signals are combined, based on the determination.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Reference will now be made in detail to exemplary embodiments of the present invention, examples of which are illustrated in the accompanying drawings.

Figure 1:
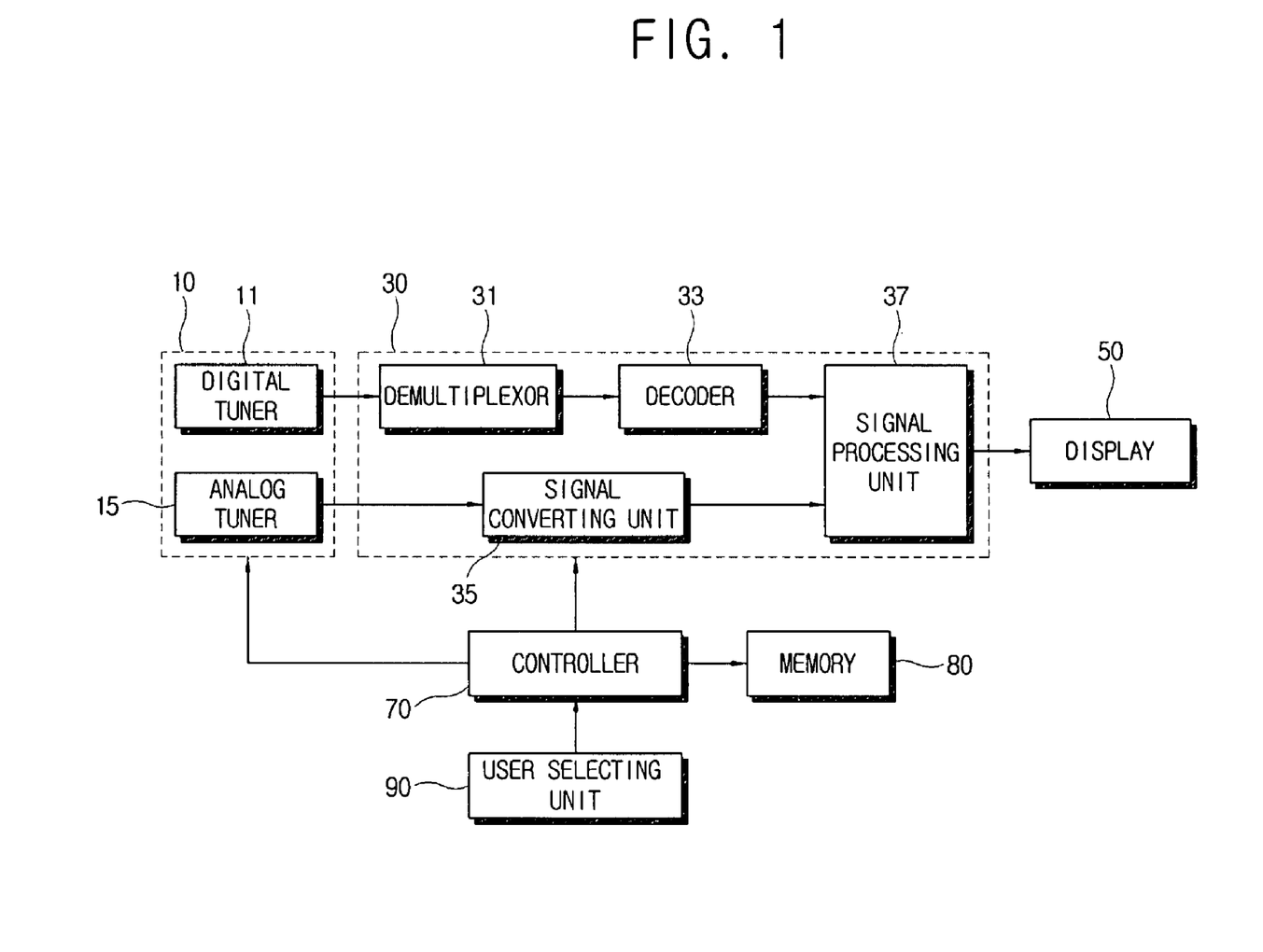
FIG. 1 is a control block diagram of a broadcasting signal receiving apparatus according to an exemplary embodiment of the present invention.

As shown in FIG. 1, a broadcasting signal receiving apparatus according to an exemplary embodiment of the present invention comprises a signal receiving unit 10 which receives broadcasting signals from external sources such as a broadcasting station and so on, a signal processor 30 which processes the broadcasting signals received from the signal receiving unit 10, a memory 80 which stores channel lists, and a controller 70 which controls these components. The broadcasting signal receiving apparatus may further comprise a display 50.

The signal receiving unit 10 receives the broadcasting signals as RF signals input from an antenna (not shown) and outputs the received broadcasting signals to the signal processor 30.

The signal receiving unit 10 includes a digital tuner 11 for selecting a digital broadcasting signal from the antenna and an analog tuner 15 for selecting an analog broadcasting signal from the antenna. Here, the digital tuner 11 and the analog tuner 15 tune the digital broadcasting signal and the analog broadcasting signal, which are received via the antenna, to broadcasting signals having corresponding frequency bands, respectively, according to a tuning control signal from the controller, which will be described later.

The digital broadcasting signal selected by the digital tuner 11 is applied to a demultiplexor 31 in the form of a transport stream. The demultiplexor 31 separates the applied digital broadcasting signal into a video signal, an audio signal and data. A decoder 33 decodes the signals and the data separated in the demultiplexor 31 and outputs the decoded signals and data to a signal processing unit 37.

The signal converting unit 35 converts the analog broadcasting signal (of a channel) selected by the analog tuner 15 into a video signal which can be processed by the signal processing unit 37, which will be described later. The signal converting unit 35 may include an A/D converter which converts the analog broadcasting signal into the digital broadcasting signal.

The signal processing unit 37 processes the video signal input thereto into a format which can be displayed on the display 50. Here, the signal processing unit 37 displays a video screen corresponding to the video signal input from the signal converting unit 35 and the decoder 33 on the display 50.

When the broadcasting signal receiving apparatus of the present invention further comprises the display 50, the display 50 comprises a display module (not shown) on which images are displayed, and a module driving unit (not shown) which processes the video signal input from the signal processing unit 37 and displays the images on the display module. In this exemplary embodiment, as the display module, various types of display modules, such as a Digital Light Processing (DLP), a Liquid Crystal Display (LCD), a Plasma Display Panel (PDP), etc., may be used.

Here, if the display module is the DLP, the module driving unit may include an optical engine, and, if the display module is the LCD, the module driving unit may include a printed circuit board which converts a signal input from the signal processing unit 37 into a data signal and a gate signal. Likewise, the module driving unit of the display 50 may be configured in different ways depending on the type of display module.

A user selecting unit 90 outputs key signals to the controller 70 in accordance with a user's operation. The user selecting unit 90 may be implemented by various input means such as a plurality of input keys, buttons, a remote controller, etc., to allow the user to input or select functions.

The memory 80 maps analog broadcasting signals corresponding to channels to channel numbers, respectively, maps digital broadcasting signals corresponding to channels to channel numbers, respectively, and stores a result of the mapping as a combined channel list. For example, a channel number is set for a digital broadcasting signal based on channel information contained in the digital broadcasting signal, and a channel number is set for an analog broadcasting signal based on a frequency at which the analog broadcasting signal is received.

At the time the broadcasting signal receiving apparatus of the present invention is set, it may generate the combined channel list by scanning the analog broadcasting signals and the digital broadcasting signals corresponding to the respective channels for each channel.

When a broadcasting station broadcasts a digital broadcasting signal to the broadcasting signal receiving apparatus, a transmission side channel number defined by the broadcasting station may be included in the digital broadcasting signal. In addition, when a broadcasting station broadcasts an analog broadcasting signal to the broadcasting signal receiving apparatus, the broadcasting station broadcasts the analog broadcasting signal with a frequency although it does not include information on a separate channel number in the analog broadcasting signal.

The controller 70 produces the combined channel list based on transmission side channel numbers of the analog and digital broadcasting signals and stores the produced combined channel list in the memory 80. At this time, if the analog broadcasting signal has no separate transmission side channel number, a channel number of the combined channel list is set according to a channel number corresponding to a frequency of the received analog broadcasting signal. Here, a channel number stored in the combined channel list stored in the memory 80 of the broadcasting signal receiving apparatus of the exemplary embodiment of the present invention is a receipt side channel number or a receiver channel number (RCN), and a channel number stored in a broadcasting signal broadcasted from a broadcasting signal source such as a broadcasting station is the transmission side channel number or a logical channel number (LCN). Here, the LCN may be contained in information contained in the broadcasting signal.

Figure 2A:
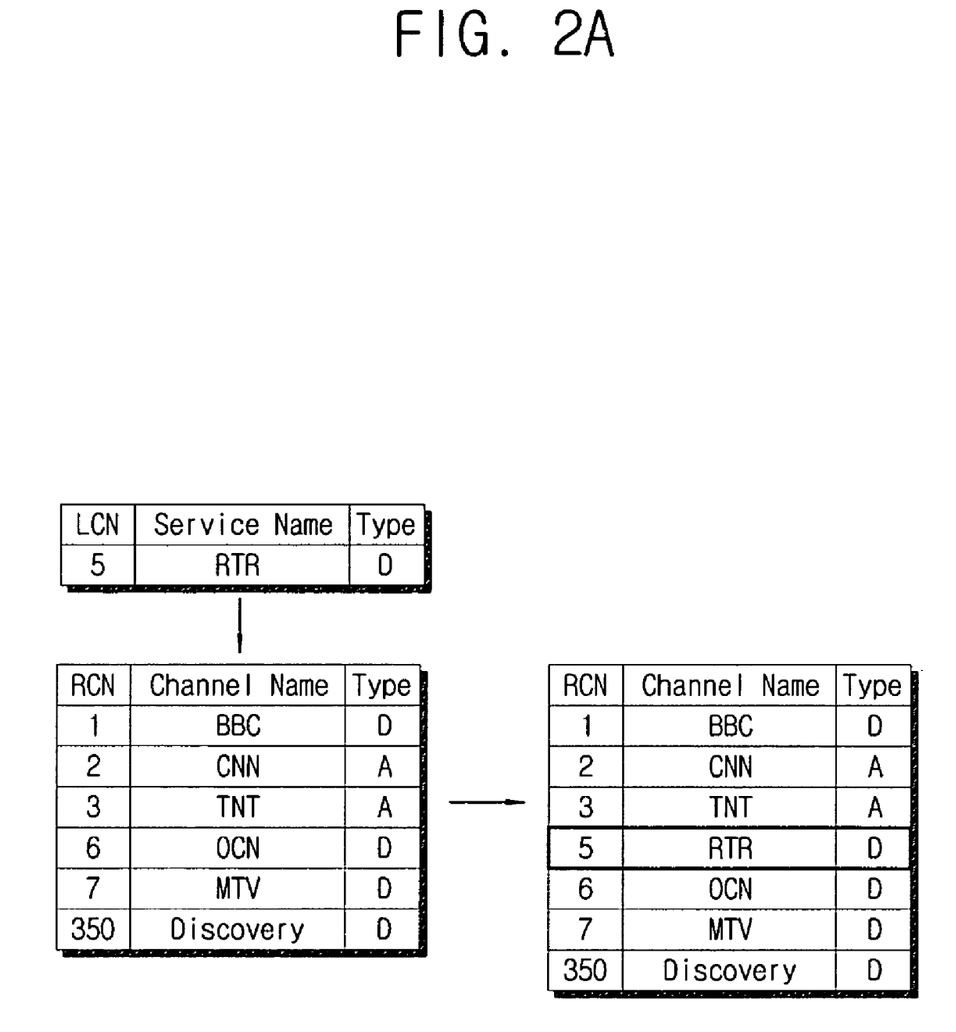
FIGS. 2A to 2E are views used to explain an embodiment of a method in which the broadcasting signal receiving apparatus according to the exemplary embodiment of the present invention makes an array for a combined channel list.

Here, if the digital broadcasting signal received through the signal receiving unit 10 contains an LCN and if a channel number corresponding to an LCN of a digital broadcasting signal corresponding to a channel is not assigned as a channel number of a broadcasting signal corresponding to a different channel, the controller 70 updates the combined channel list such that the LCN is assigned as the channel number of the digital broadcasting signal corresponding to the channel. For example, referring to FIG. 2A, if the broadcasting signal receiving apparatus of the exemplary embodiment of the present invention receives a digital broadcasting signal with an LCN of 5 from a broadcasting signal having a service name of RTR corresponding to a channel and if a broadcasting signal corresponding to a channel number of 5 is not set in the broadcasting signal receiving apparatus, an RCN of the broadcasting signal having the service name of RTR corresponding to the channel becomes 5. Then, the broadcasting signal corresponding to the RTR channel received through the channel has a channel number of 5. In other words, when the user selects the channel number of 5 in the broadcasting signal receiving apparatus, the controller 70 selects and displays the broadcasting signal corresponding to the RTR channel.

Here, if the digital broadcasting corresponding to the channel, received through the signal receiving unit 10, does not contain an LCN, the controller 70 updates the combined channel list such that a channel number of the digital broadcasting signal corresponding to the channel is assigned as a channel number not assigned to a broadcasting signal corresponding to a different channel of the combined channel list.

Figure 2B:
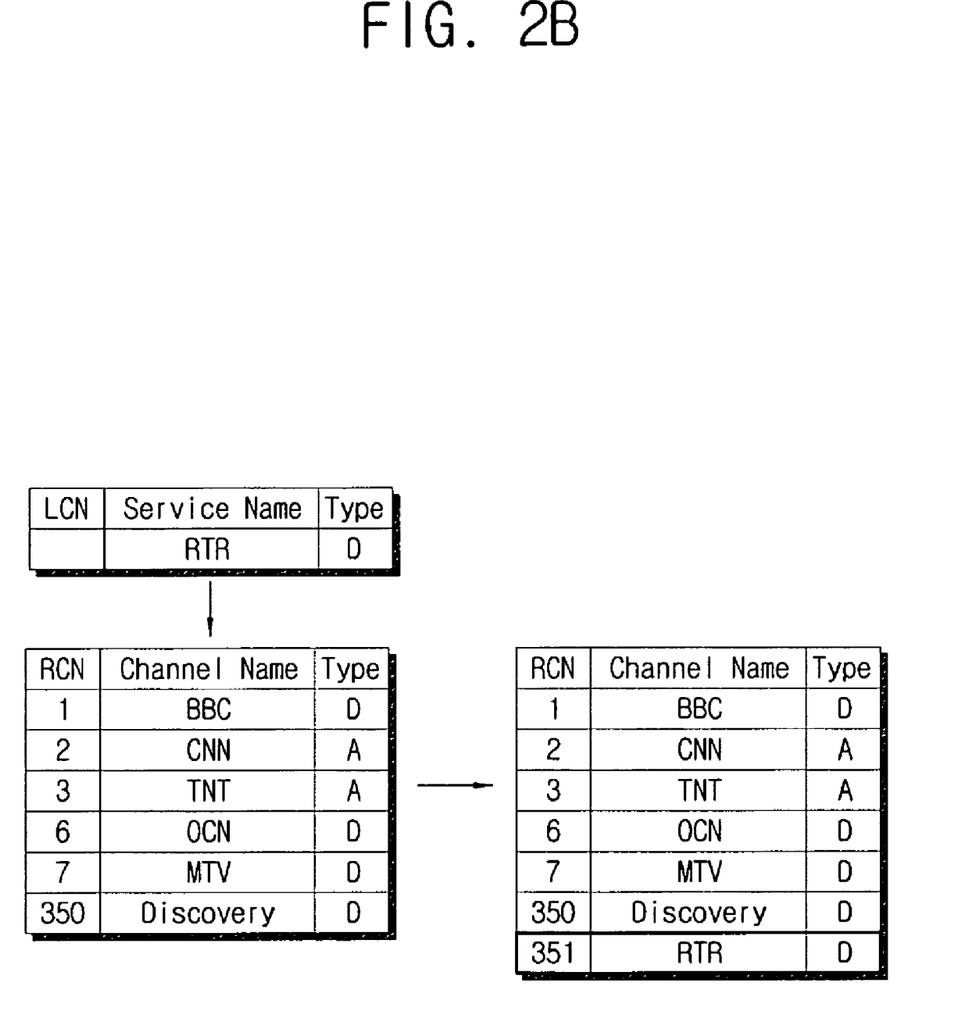

At this time, it is preferable but not necessary that the controller 70 generates a channel number next to the last channel number of the combined channel list and updates the combined channel list such that the generated channel number is assigned as a channel number of the digital broadcasting signal. For example, referring to FIG. 2B, if a broadcasting signal having a service name of RTR corresponding to a channel is received in the broadcasting signal receiving apparatus through the signal receiving unit 10, the received broadcasting signal does not contain an LCN, and the broadcasting signal receiving apparatus has a combined channel list including channel numbers up to 350, the broadcasting signal having the service name of RTR, received in the signal receiving unit 10 through the channel, has a channel number of 351.

Although it has been illustrated here that, when the digital broadcasting signal with no LCN is received, the channel number next to the last channel number is generated and assigned as the channel number of the digital broadcasting signal, the digital broadcasting signal with no LCN may be stored in a channel number without a separate RCN in the combined channel list stored in the memory 80. For example, the digital broadcasting signal with no LCN corresponding to a channel may be stored in channel numbers 5, 8, etc. in FIG. 2B.

In addition, if the digital broadcasting signal corresponding to the channel contains an LCN and if a channel number corresponding to the LCN is assigned as a channel number of a digital broadcasting signal corresponding to a different channel, the controller 70 may update the combined channel list such that a channel number of the digital broadcasting signal corresponding to the channel is assigned as a channel number not assigned to a broadcasting signal corresponding to a different channel of the combined channel list.

At this time, it is preferable but not necessary that the controller 70 generates a channel number next to the last channel number of the combined channel list and updates the combined channel list such that the generated channel number is assigned as a channel number of the digital broadcasting signal corresponding to the channel, received through the signal receiving unit 10.

Figure 2C:
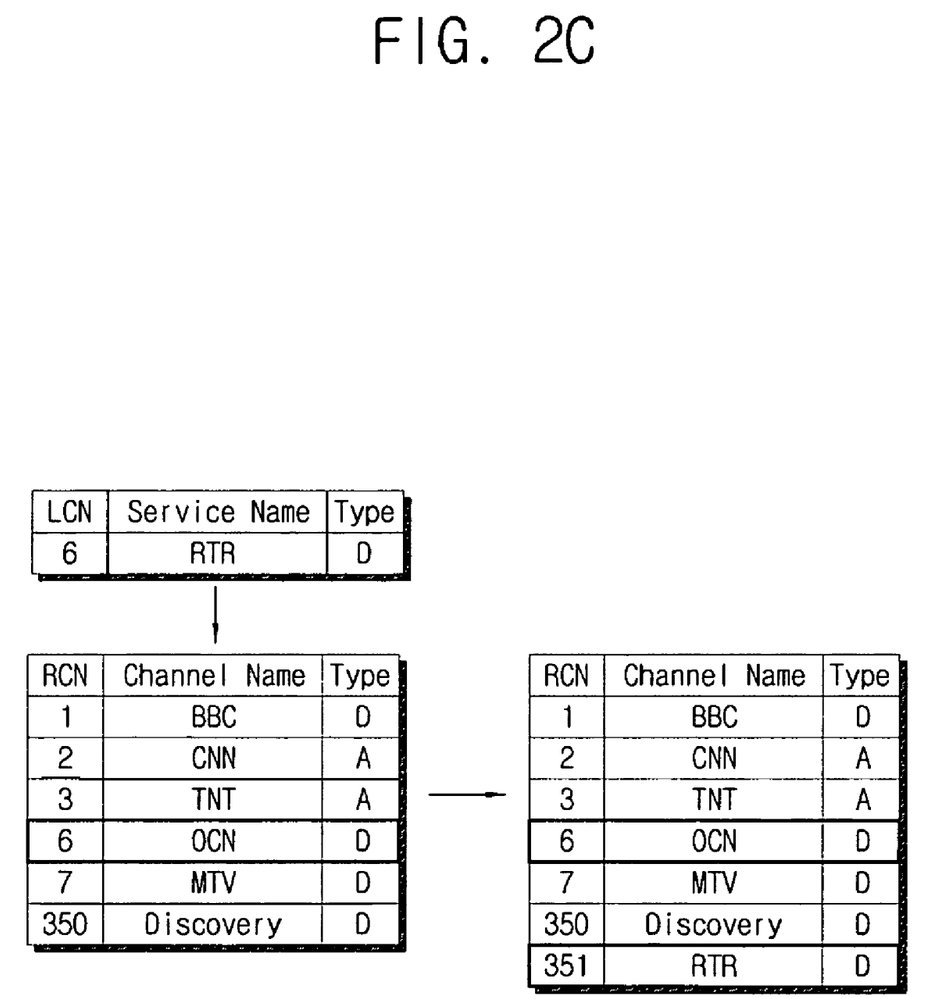

An example where a broadcasting signal having a service name of RTR corresponding to a channel is received in the broadcasting signal receiving apparatus through the signal receiving unit 10, an LCN of the received broadcasting signal is 6, and the broadcasting signal receiving apparatus has a combined channel list including channel numbers up to 350 will be described with reference to FIG. 2C. Here, if the broadcasting signal receiving apparatus includes a combined channel list in which a digital broadcasting signal is stored in an RCN channel number 6, a channel number next to the last channel number in the combined channel list, for example, 351 in FIG. 2C, is generated and assigned as a channel number of the digital broadcasting signal. However, it should be understood that the digital broadcasting signal may be stored in a channel number without a separate LCN in the combined channel list stored in the memory 80.

In addition, if the digital broadcasting signal corresponding to the channel, received through the signal receiving unit 10, contains an LCN and if a channel number corresponding to the LCN is assigned as a channel number of a different analog broadcasting signal, the controller 70 may grant a priority to the digital broadcasting signal, assign the digital broadcasting signal to a channel number corresponding to the LCN, and then update the combined channel list such that a channel number of an analog broadcasting signal is assigned as a channel number not assigned to different broadcasting signals in the combined channel list. In this case, it is preferable but not necessary that the controller 70 assigns the channel number of the analog broadcasting signal to a lower channel number of channel numbers not assigned to the different broadcasting signals.

Figure 2D:
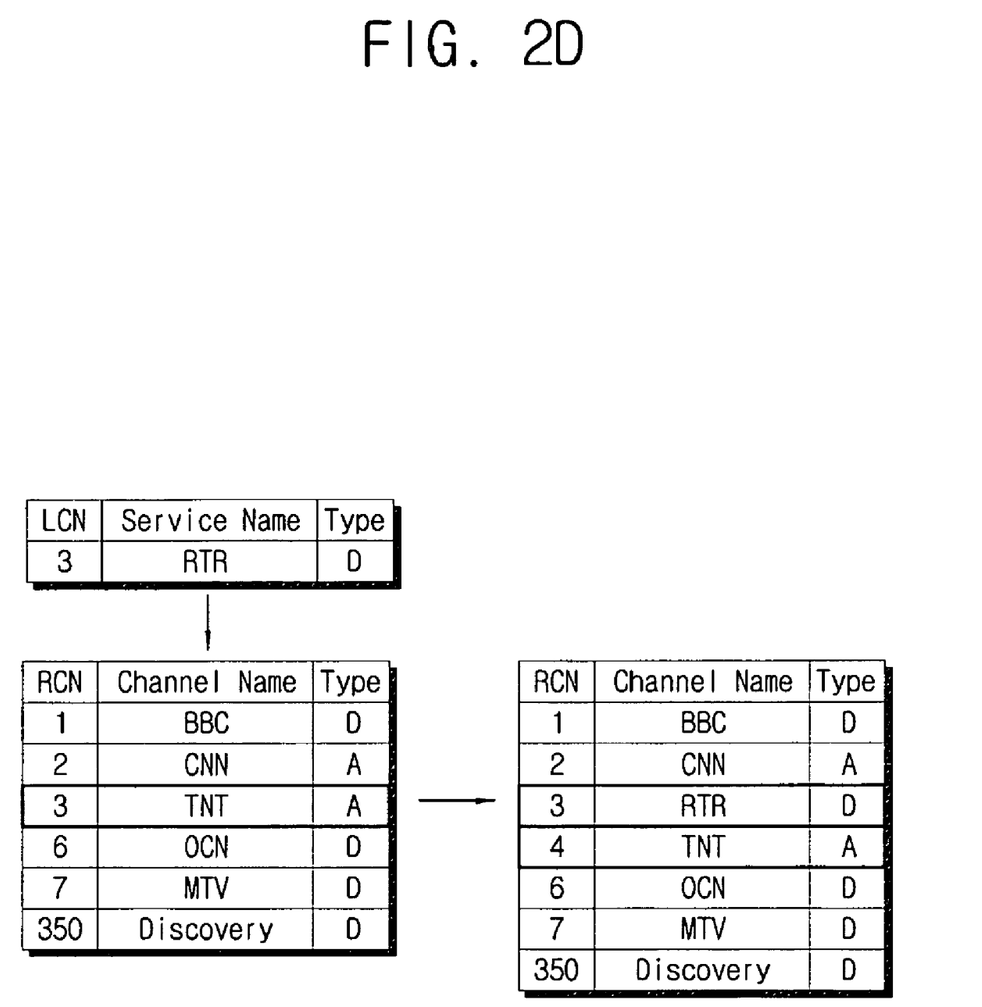

Next, an example where a broadcasting signal having a service name of RTR corresponding to a channel is received in the broadcasting signal receiving apparatus through the signal receiving unit 10 and an LCN of the received broadcasting signal is 3 will be described with reference to FIG. 2D. Here, if the broadcasting signal receiving apparatus includes a combined channel list in which an analog broadcasting signal is stored in an RCN channel number 3, the controller 70 sets the RCN of the broadcasting signal having the service name of RTR corresponding to the channel to be 3 and may update the combined channel list such that a different broadcasting signal having a channel name of TNT with an RCN channel number of 3 is assigned to an RCN channel number of 4, which is a lower number, among channel numbers not assigned in the combined channel list.

In addition, if an analog broadcasting signal corresponding to a channel is received through the signal receiving unit 10, the controller 70 may update the combined channel list such that the analog broadcasting signal of the channel is assigned to a channel number not assigned to broadcasting signals corresponding to different channels in the combined channel list. In this case, the controller 70 may assign the analog broadcasting signal to a lower channel number of channel numbers not assigned to different broadcasting signals.

Figure 2E:
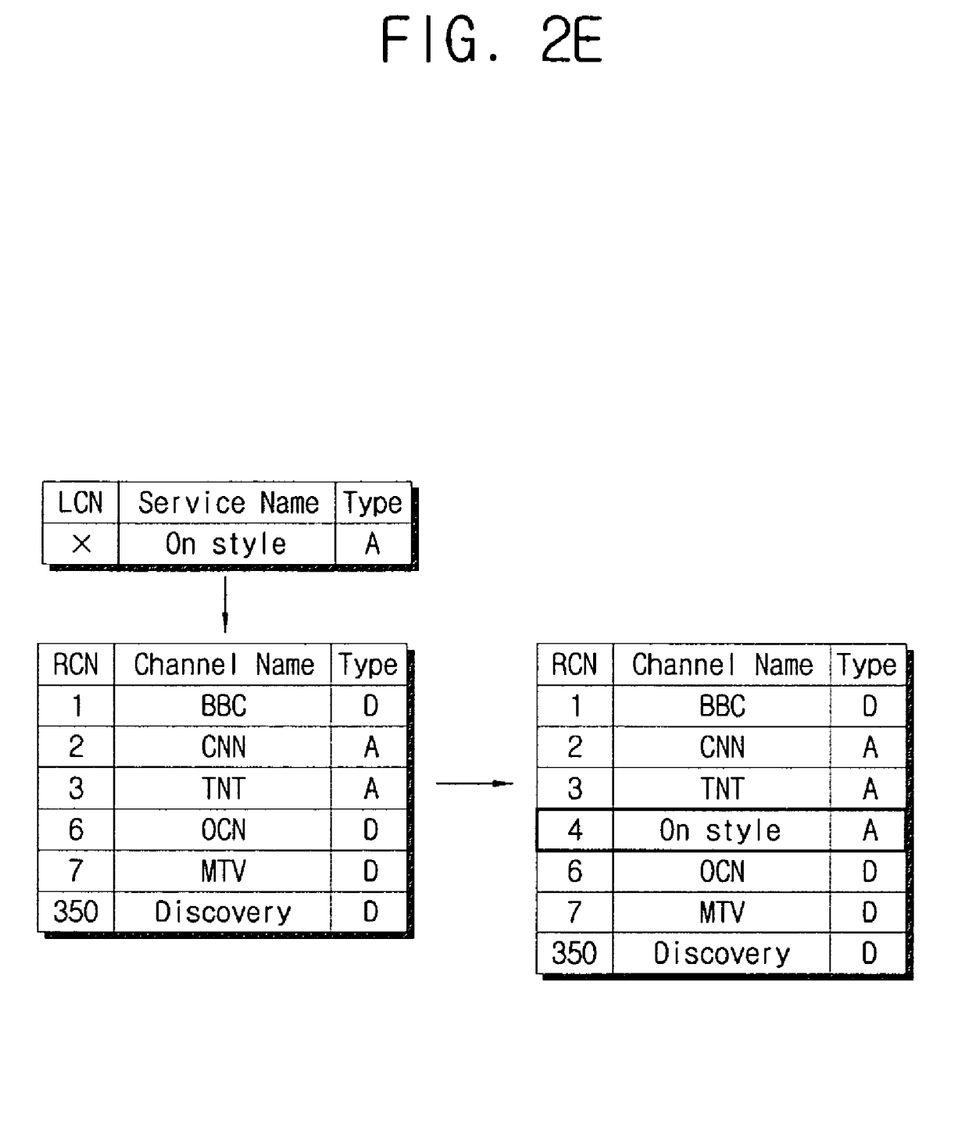

Next, an example where an analog broadcasting signal having a service name of 'On Style' is received in the broadcasting signal receiving apparatus through the signal receiving unit 10 will be described with reference to FIG. 2E. Here, the analog broadcasting signal does not contain a separate LCN channel number. In this case, the broadcasting signal receiving apparatus may update the combined channel list such that the received broadcasting signal is assigned to an RCN channel number of 4, which is a lower number, among channel numbers not assigned to broadcasting signals of different channels. Here, a channel number of the analog broadcasting signal is sufficient if it is a channel number not assigned to broadcasting signals of separate channels, and is not necessarily limited to a lower channel number.

The controller 70 may store at least one of a kind, a service name, and receipt side channel information of a broadcasting signal in the combined channel list. For example, as shown in FIGS. 2A to 2E, information on whether a broadcasting signal of a corresponding channel is an analog signal (A) or a digital signal (D), a channel name, and a receipt side channel number may be stored in the combined channel list.

When a user selects a certain channel number through the user selecting unit 90 to watch a broadcasting signal of the channel, the controller 70 controls a tuner of the signal receiving unit 10 to select the broadcasting signal of the channel corresponding to an RCN channel number of the combined channel list stored in the memory 80. Then, the channel selected by the tuner is displayed on the display 50.

In addition, the controller 70 controls an interface generating unit (not shown) to display the combined channel list stored in the memory 80 according to selection of the user selecting unit 90 and controls the signal processing unit 37 to process an interface screen generated by the interface generating unit and display the processed interface screen on the display 50.

Hereinafter, a flow chart of a control method of the broadcasting signal receiving apparatus according to the exemplary embodiment of the present invention will be described with reference to FIG. 3.

Figure 3:
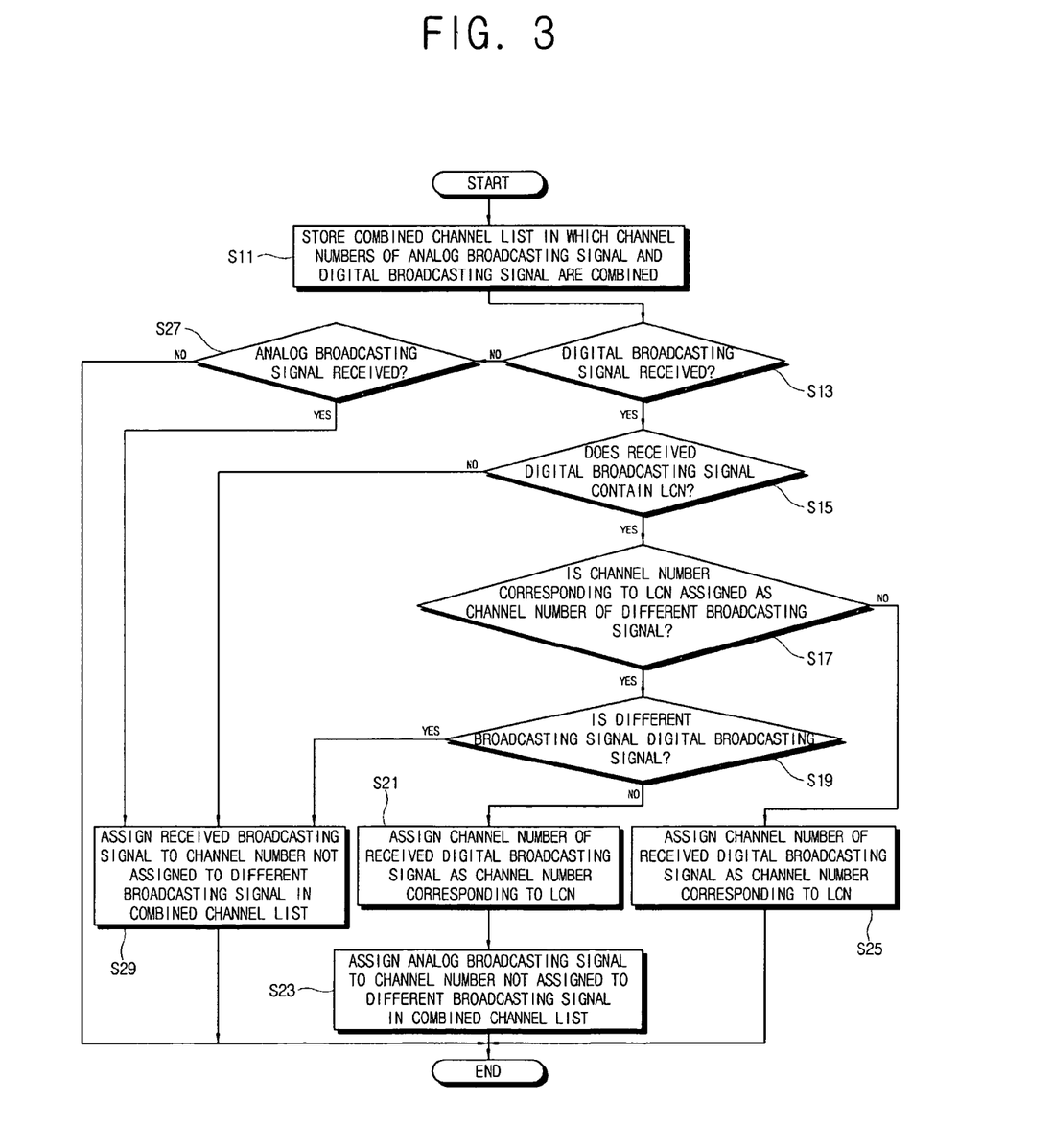
FIG. 3 is a flow chart of a control method of the broadcasting signal receiving apparatus provided by the exemplary embodiment of the present invention.

As shown in FIG. 3, the broadcasting signal receiving apparatus of the exemplary embodiment of the present invention stores a combined channel list based on an analog broadcasting signal and a digital broadcasting signal in the memory 80 at operation S11. Specifically, the combined channel list may be generated and updated as follows.

When the broadcasting signal receiving apparatus of the exemplary embodiment of the present invention receives a digital broadcasting signal corresponding to a channel through the signal receiving unit 10 at operation S13, the controller 70 determines whether or not the received digital broadcasting signal contains an LCN at operation S15. If it is determined that the received digital broadcasting signal contains the LCN, the controller 70 determines whether or not a channel number corresponding to the LCN of the received digital broadcasting signal is assigned as a channel number of a different broadcasting signal corresponding to a different channel at operation S17. If it is determined that the channel number corresponding to the LCN of the received digital broadcasting signal is not assigned as the channel number of the different broadcasting signal corresponding to the different channel, the controller 70 newly assigns the channel number of the received digital broadcasting signal as the channel number corresponding to the LCN at operation S25 and updates the combined channel list by reflecting the newly assigned channel number in the combined channel list.

On the other hand, if it is determined at operation S17 that the channel number corresponding to the LCN of the received digital broadcasting signal is assigned as the channel number of the different broadcasting signal corresponding to the different channel, and if is determined at operation S19 that the broadcasting signal corresponding to the different channel is a digital broadcasting signal, the controller 70 assigns the received digital broadcasting signal to a channel number not assigned to different broadcasting signals in the combined channel list at operation S29. The channel number assigned to the received digital broadcasting signal has been explained with reference to FIGS. 1 and 2C, and therefore, explanation thereof will here omitted.

In addition, if it is determined at operation S17 that the channel number corresponding to the LCN of the received digital broadcasting signal is assigned as the channel number of the different broadcasting signal corresponding to the different channel, and if is determined at operation S19 that the broadcasting signal corresponding to the different channel is an analog broadcasting signal, the controller 70 grants a priority to the received digital broadcasting signal and assigns a channel number of the received digital broadcasting signal as a channel number of the LCN of the received digital broadcasting signal at operation S21. Then, the controller 70 assigns the analog broadcasting signal to a channel number not assigned to different broadcasting signals in the combined channel list at operation S23. The channel number assigned to the analog broadcasting signal has been explained with reference to FIGS. 1 and 2D, and therefore, explanation thereof will here omitted.

On the other hand, if it is determined at operation S15 that the digital broadcasting signal corresponding to the channel, received through the signal receiving unit 10, does not contain the LCN, the controller 70 assigns the received digital broadcasting signal corresponding to the channel to a channel number not assigned to different broadcasting signals in the combined channel list at operation S29. The channel number assigned to the digital broadcasting signal has been explained with reference to FIGS. 1 and 2B, and therefore, explanation thereof will here omitted.

On the other hand, if it is determined at operation S27 that the broadcasting signal receiving apparatus of the exemplary embodiment of the present invention receives an analog broadcasting signal through the signal receiving unit 10, the controller 70 assigns the received analog broadcasting signal to a channel number not assigned to different broadcasting signals in the combined channel list at operation S29. The channel number assigned to the analog broadcasting signal has been explained with reference to FIGS. 1 and 2E, and therefore, explanation thereof will here omitted.

The broadcasting signal receiving apparatus of the exemplary embodiment of the present invention may or may not include the display 50.

For example, if the broadcasting signal receiving apparatus of the exemplary embodiment of the present invention is a set-top box separated from a display apparatus, it may not include the display 50. However, if the broadcasting signal receiving apparatus is incorporated into a display apparatus, it may include the display 50.

As apparent from the description, the exemplary embodiment of the present invention provides a novel broadcasting signal receiving apparatus allowing a user, who uses a broadcasting signal receiving apparatus for receiving both an analog broadcasting signal a digital broadcasting signal, to select a desired channel without difficulty, and a control method thereof.

Although a few embodiments of the exemplary embodiment of the present invention have been shown and described, it will be appreciated by those skilled in the art that changes may be made in these embodiments without departing from the principles and spirit of the invention, the scope of which is defined in the appended claims and their equivalents.

What is claimed is:

1. A broadcasting signal receiving apparatus, the apparatus comprising:
   a signal receiving unit which receives an analog broadcasting signal and a digital broadcasting signal; and
   a controller which produces a combined channel list based on logical channel numbers of the analog broadcasting signal and the digital broadcasting signal,
   wherein, if the digital broadcasting signal corresponding to a channel contains a logical channel number and if the logical channel number is not assigned to a different channel, the controller updates the combined channel list such that the logical channel number is assigned as a channel number of the digital broadcasting signal corresponding to the channel.

2. The broadcasting signal receiving apparatus according to claim 1, the apparatus further comprising a memory, wherein the controller stores the combined channel list in the memory.

3. The broadcasting signal receiving apparatus according to claim 2, wherein the controller further stores in the memory at least one of information on whether a broadcasting signal received in the signal receiving unit is the analog broadcasting signal or the digital broadcasting signal, and receipt side information.

4. The broadcasting signal receiving apparatus according to claim 2, further comprising:
   a display on which an image is displayed based on at least one of the digital broadcasting signal and the analog broadcasting signal; and
   a user selecting unit which selects a channel number,
   wherein, if the channel number is selected through the user selecting unit, the controller controls the signal receiving unit to select a broadcasting signal corresponding to a channel corresponding to a channel number in the combined channel list stored in the memory.

5. The broadcasting signal receiving apparatus according to claim 4, wherein the controller controls the combined channel list stored in the memory to be displayed on the display.

6. The broadcasting signal receiving apparatus according to claim 4, wherein the signal receiving unit comprises an analog tuner which selects the analog broadcasting signal and a digital tuner which selects the digital broadcasting signal.

7. The broadcasting signal receiving apparatus according to claim 1, wherein, if the digital broadcasting signal corresponding to the channel does not contain the logical channel number, the controller updates the combined channel list such that the channel number of the digital broadcasting signal corresponding to the channel is assigned a number not assigned in the combined channel list.

8. The broadcasting signal receiving apparatus according to claim 7, wherein, if the digital broadcasting signal corresponding to the channel does not contain the logical channel number, the controller generates a channel number next to a last channel number in the combined channel list and updates the combined channel list such that the generated channel number is assigned as the channel number of the digital broadcasting signal corresponding to the channel.

9. The broadcasting signal receiving apparatus according to claim 1, wherein, if the digital broadcasting signal corresponding to a channel contains the logical channel number and if the logical channel number is assigned to a different channel, the controller updates the combined channel list such that the channel number of the digital broadcasting signal corresponding to the channel is assigned a number not assigned in the combined channel list.

10. The broadcasting signal receiving apparatus according to claim 9, wherein, if the digital broadcasting signal corresponding to the channel contains the logical channel number and if the logical channel number is assigned to the different channel, the controller generates a channel number next to a last channel number in the combined channel list and updates the combined channel list such that the generated channel number is assigned as the channel number of the digital broadcasting signal corresponding to the channel.

11. The broadcasting signal receiving apparatus according to claim 1, wherein, if the digital broadcasting signal corresponding to a channel contains the logical channel number and if the logical channel number is assigned as a channel number of a different analog broadcasting signal, the controller assigns the digital broadcasting signal to the logical channel number and updates the combined channel list such that a channel number of the analog broadcasting signal is assigned a number not assigned in the combined channel list.

12. The broadcasting signal receiving apparatus according to claim 11, wherein the controller assigns the channel number of the analog broadcasting signal to a lower channel number of channel numbers not assigned to different broadcasting signals.

13. The broadcasting signal receiving apparatus according to claim 1, wherein, if the analog broadcasting signal corresponding to a channel is received, the controller updates the combined channel list such that a channel number of the analog broadcasting signal corresponding to the channel is assigned a number not assigned in the combined channel list.

14. The broadcasting signal receiving apparatus according to claim 13, wherein the controller assigns the channel number of the analog broadcasting signal to a lower channel number of channel numbers not assigned to different broadcasting signals.

15. A method of controlling a broadcasting signal receiving apparatus, the method comprising:
- receiving a broadcasting signal comprising one of an analog broadcasting signal of a channel and a digital broadcasting signal of a channel;
- determining a logical channel number of the received broadcasting signal;
- producing a combined channel list in which channel numbers of broadcasting signals are combined, based on the logical channel number; and
- if the digital broadcasting signal corresponding to a channel contains a logical channel number and if the logical channel number is not assigned to a different channel, updating the combined channel list such that the logical channel is assigned as a channel number of the digital broadcasting signal corresponding to the channel.

16. The method of controlling a broadcasting signal receiving apparatus of claim 15, the method further comprising storing the combined channel list.

17. The method of controlling a broadcasting signal receiving apparatus of claim 15, wherein the combined channel list only comprises channels currently available for viewing by the user.

18. The method of controlling a broadcasting signal receiving apparatus of claim 15, wherein the combined channel list is a list of channel currently available for viewing provided during user viewing a digital channel.

19. The method of controlling a broadcasting signal receiving apparatus of claim 15, wherein the combined channel list is a list of channel currently available for viewing provided during user viewing an analog channel.

20. A method of controlling a broadcasting signal receiving apparatus of claim 15, further comprising:
- receiving another broadcasting signal comprising one of an analog broadcasting signal of a channel and a digital broadcasting signal of a channel;
- determining whether the received another broadcasting signal is analog or digital;
- when the determined another broadcasting signal is digital, determining whether a logical channel number is provided;
- when the logical channel number is not provided for the determined digital broadcasting signal, an available channel number is assigned; and
- when the logical channel number is provided and conflicts with an existing channel number in the combined channel list, checking whether the received digital broadcasting signal conflicts with an analog channel or a digital channel and based on said checking, assigning different channel number to the determined digital broadcasting channel.

21. A method of controlling a broadcasting signal receiving apparatus, the method comprising:
- receiving a broadcasting signal comprising one of an analog broadcasting signal of a channel and a digital broadcasting signal of a channel;
- determining a logical channel number of the received broadcasting signal;
- producing a combined channel list comprising channel numbers for currently available for viewing analog and digital channels in which a channel number is assigned to the received broadcasting signal based on a received logical channel number of the received broadcast signal.

* * * * *